May 28, 1940.    A. E. ANDERSON    2,202,722
SYSTEM OF ELECTRIC DISTRIBUTION
Filed Aug. 17, 1938
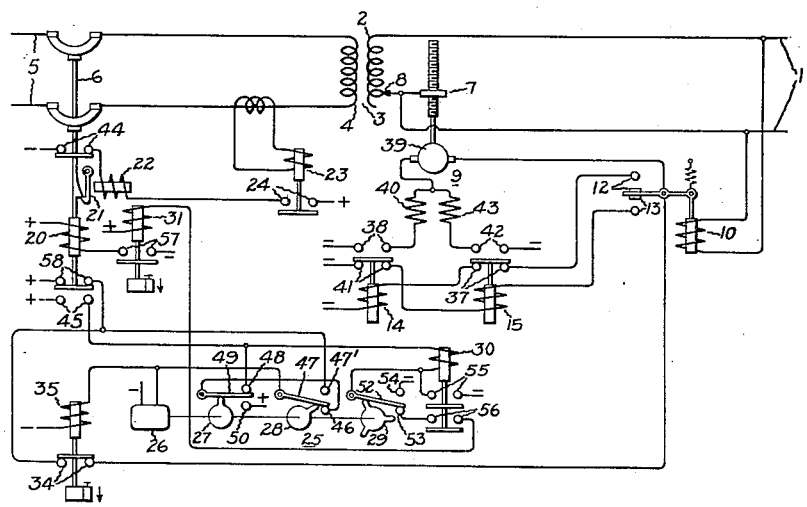
Inventor:
Arvid E. Anderson,
by Harry E. Dunham
His Attorney.

Patented May 28, 1940

2,202,722

UNITED STATES PATENT OFFICE 2,202,722

SYSTEM OF ELECTRIC DISTRIBUTION

Arvid E. Anderson, Drexel Hill, Pa., assignor to General Electric Company, a corporation of New York Application August 17, 1938, Serial No. 225,395

8 Claims. (Cl. 171—119)

My invention relates to systems of electric distribution and particularly to such a system in which the connection between a supply circuit and a load circuit includes an automatically reclosed overload circuit breaker and a transformer which has associated therewith a tap-changing control mechanism for regulating the voltage applied to the load circuit.

One object of my invention is to provide in such a system of electric distribution an interlocking arrangement between the tap-changing control apparatus and the automatic reclosing means of the circuit breaker so as to insure that no tap-changing can occur under abnormal current conditions in the system.

My invention will be better understood from the following description when taken in connection with the accompanying drawing, the single figure of which illustrates a system of electric distribution embodying my invention, and its scope wil be pointed out in the appended claims.

Referring to the drawing, I have shown a system of electric distribution comprising a load circuit 1 which is connected to the secondary winding 2 of a power transformer 3, the primary winding 4 of which is connected to a supply circuit 5 by means of a circuit breaker 6 which may be of any suitable type, examples of which are well known in the art. In order to simplify the disclosure I have shown single phase circuits 1 and 5, but it is obvious that it is applicable to circuits of any number of phases. While I have shown the circuit breaker 6 in the primary circuit of the transformer 2, it will be obvious to those skilled in the art that in some systems it may be desirable to have it in the secondary circuit instead of the primary circuit.

For varying the voltage applied to the load circuit 1, I have shown a tap-changing mechanism 7 having a movable contact 8 which is adapted to be moved, by means of a reversible motor 9, into engagement with a number of spaced taps of the secondary winding 2 of the transformer 3. My invention is not limited to the particular type of voltage regulating means shown, nor is it limited to a system in which the voltage regulating means is in the secondary circuit of the transformer 2 as it is obvious that it may be connected in the primary circuit of the transformer. For controlling the reversible motor 9 automatically in response to an electrical condition of the load circuit 1, I have shown a contact-making voltmeter 10, the energizing winding of which is connected across the load circuit 1 in any suitable manner. The contact-making voltmeter 10 is provided with the contacts 12 which are closed when the voltage of circuit 1 is below a predetermined value and with the contacts 13 which are closed when the voltage of the circuit 1 is above a predetermined value. The contacts 12 control the circuit of a control relay 14 which, when energized, controls the circuit of the reversible motor 9 in any suitable manner so as to cause the contact 8 to be moved in the proper direction to increase the voltage applied to the load circuit 1. The contacts 13 control the circuit of a control relay 15 which, when energized, controls the circuit of the reversible motor 9 so that the contact 8 is moved in the proper direction to decrease the voltage applied to the load circuit 1. Preferably the tap-changing mechanism 7 is provided with suitable means, examples of which are well known in the art, for insuring that, when the motor 9 is energized to effect a tap change, the motor remains energized until the tap-changing operation has been completed. However, in order to simplify the disclosure, such well known details, to which my present invention does not relate, have been omitted from the drawing.

As shown in the drawing, the circuit breaker 6 is of the well known latched-in type and is provided with a closing coil 20 which, when energized, closes the circuit breaker 6, a latch 21 for holding the circuit breaker in the closed position and a trip coil 22 which, when energized, releases the latch 21 to allow the circuit breaker 6 to open. For effecting the opening of the circuit breaker 6 when a fault occurs on the load circuit 1, I have shown an overcurrent relay 23 which is connected in series relation with the supply circuit 5 in any suitable manner so that the relay 23 closes its contacts 24 in response to a predetermined abnormal current flow through the supply circuit 5. The closing of the contacts 24 of the overcurrent relay 23 completes an energizing circuit for the trip coil 22 when the circuit breaker 6 is closed. It will be obvious to those skilled in the art that any other suitable fault responsive means may be provided for effecting the opening of the circuit breaker 6.

For effecting the automatic reclosing of the circuit breaker 6 a predetermined number of times and for locking it out if it fails to remain closed after being reclosed a predetermined number of time within a predetermined time interval, I provide a motor-driven timer 25 which may be any one of the well known types which are arranged to be set into operation when the circuit breaker opens. In the particular arangement shown in the drawing, the timer 25 includes a normally de-energized motor 26 and three cams, 27, 28 and 29, which are arranged to be driven by the motor 26, when it is energized, and which respectively control suitable contacts associated therewith so as to effect the desired reclosing operation of the circuit breaker 6. The circuit of the driving motor 26 is initially completed in response to the opening of the circuit breaker 6 and thereafter remains completed until the timer 25 has completed its cycle of operation. Associated with the timer 25 is a control relay 30 which in turn controls the energization of a control relay 31 associated with the closing coil 20 of the circuit breaker 6.

In order to prevent the tap-changing mechanism 7 from being operated while the automatic reclosing mechanism 25 is in operation to effect the reclosure of the circuit breaker 6, I provide in accordance with my invention means for rendering the tap-changing mechanism 7 inoperative while the automatic reclosing mechanism 25 is in operation. In the particular embodiment of my invention shown in the drawing, this result is obtained by having the operating circuits of the tap-changing mechanism 7 include the normally closed contacts 34 of a control relay 35, the winding of which is arranged to be energized while the automatic reclosing circuit breaker mechanism 25 is in operation. As shown in the drawing, the energizing winding of the relay 35 is connected in parallel with the driving motor 26 of the automatic reclosing mechanism 25 so that the relay 35 is energized whenever the driving motor 26 is energized.

The operation of the arrangement shown in the drawing is as follows:

When the circuit breaker 6 is closed and the load connected to the circuit 1 is such that sufficient current does not flow through the winding of overcurrent relay 23 to cause the relay to close its contacts 24, the voltage of the load circuit 1 is maintained at a substantially constant value by the regulating means 7. When the voltage of the load circuit 1 decreases below a predetermined value, the contact-making voltmeter 10 closes its contacts 12 and completes an energizing circuit for the control relay 14 through contacts 37 of relay 15, contacts 12 of voltmeter 10 and contacts 34 of relay 35. Relay 14 by closing its contacts 38 completes through contacts 34 of relay 35 an energizing circuit for the armature winding 39 and field winding 40 of motor 9 so that the contact 8 of the tap-changing arrangement 7 is moved in the proper direction to engage a higher voltage tap of the secondary winding 2 of the transformer 3.

When the voltage of the load circuit 1 increases above a predetermined value, the contact-making voltmeter 10 closes its contacts 13 and completes an energizing circuit for the control relay 15 through contacts 41 of relay 14, contacts 13 of voltmeter 10 and contacts 34 of relay 35. Relay 15 by closing its contacts 42 completes through contacts 34 of relay 35 an energizing circuit for the armature winding 39 and field winding 43 of the motor 9 so that the contact 8 of the tap-changing arrangement 7 is moved in the proper direction to engage a lower voltage tap of the secondary winding 2 of the transformer 3.

When an overload occurs on the load circuit 1 which causes sufficient current to flow through the winding of relay 23 so that it closes its contacts 24, an energizing circuit is completed for the trip coil 22 through the auxiliary contacts 44 of the circuit breaker 6 to release the latch 21 so that the circuit breaker 6 opens. The closing of the auxiliary contacts 45 of the switch 6 completes an energizing circuit for the driving motor 26 of the automatic reclosing means 25 through contacts 46 and 47 controlled by the cam 28 of the timer 25 and contacts 48 and 49 controlled by the cam 27 of the timer 25. At the same time an energizing circuit is completed for the relay 35, the winding of which is connected in parallel with the operating winding of the motor 26. Relay 35 by opening its contacts 34 interrupts the heretofore described controlled circuits of the tap-changing mechanism 7 so that the tap-changing arrangement is rendered inoperative as long as the automatic reclosing mechanism 25 is in operation. In some cases it may be desirable to have relay 35 designed in any suitable manner well known in the art so that it maintains its contacts 34 open for a short time after its winding is de-energized.

Immediately after the driving motor 26 starts to rotate, the cam 27 causes the contact 49 to disengage contact 48 and immediately engage contact 50 so that the energizing circuits for the motor 26 and the operating winding of relay 35 remain completed independently of the contacts 45 of the circuit breaker 6 throughout the operating cycle of the timer 25.

After the motor 26 has been in operation for a predetermined time, cam 29 moves the associated movable contact 52 out of engagement with contact 53 and into engagement with contact 54 thereby completing an energizing circuit for the auxiliary relay 30 through the auxiliary contacts 45 on the circuit breaker 6. By closing its contacts 55, relay 30 completes a locking circuit for itself which is independent of the contacts 52 and 54 of the timer 25 so that the relay 30 is not de-energized by the subsequent opening of these contacts.

Further movement of the cam 29 then effects the opening of the contacts 52 and 54 and the closing of the contacts 52 and 53 so that an energizing circuit is completed for the control relay 31 through the contacts 56 of relay 30, contacts 52 and 53 of the timer 25 and contacts 55 of relay 30. Relay 31 by closing its contacts 57 completes an energizing circuit for the closing coil 20 to effect the closing of the circuit breaker 6. By opening its auxiliary contacts 45, the circuit breaker 6 effects the de-energization of the relay 30 which, in turn, by opening its contacts 55 and 56 interrupts its own holding circuit and the energizing circuit for the operating winding of relay 31. The relay 31, however, is designed in any suitable manner so that it maintains its contacts 57 closed long enough to insure that the closing operation of the circuit breaker 6 is completed.

If the overload is still connected to the load circuit 1 when the circuit breaker 6 recloses, the trip coil 22 is again energized to effect the opening of the circuit breaker 6.

After the driving motor 26 of the timer 25 has been in operation for a second predetermined time interval after the first reclosure of the circuit breaker 6, the cam 29 against effects the opening of the contacts 52 and 53 and the closing of the contacts 52 and 54 and the subsequent closing of the contacts 52 and 53 to effect the energization of the control relay 30 and the closing of the circuit breaker 6 in the manner above described if it is open at that time. After a third predetermined time interval, the cam 29 again effects the same operation of the contacts 52, 53 and 54 in the manner above described to close the circuit breaker 6 a third time if it is open. In this manner it will be seen that the motor-operated timer 25 can effect the reclosing of the circuit breaker 6 a predetermined number of times within a predetermined time interval which, in the particular arrangement shown, is three times during one revolution of the cam 29.

After the cam 29 has effected the operation of the contacts 52, 53 and 54 for the third time and just before the timer 25 is restored to its normal position, the cam 28 opens the contacts 46 and 47 and closes the contacts 47 and 47' thereby opening the energizing circuits of the driving motor 26 and relay 35 which were completed through the contacts 46 and 47. If the circuit breaker 6 is open at the time the contacts 47 and 47' are closed, the timer remains in the position in which the contacts 47 and 47' are closed which position is called the lock-out position. However, if the circuit breaker 6 is closed when the timer reaches its lock-out position, a circuit is completed for the motor 26 and relay 35 through the auxiliary contacts 58 on the circuit breaker 6 so that the timer 25 is moved from its lock-out position to its normal position and the relay 35 maintains the tap changing mechanism 7 inoperative. When the timer 25 leaves its lock-out position, cam 28 opens the contacts 47 and 47' and recloses the contacts 46 and 47 so as to reestablish the original holding circuits for the motor 26 and relay 35. When the timer 25 reaches its normal position, the circuits of the motor 26 and relay 35 are opened by the cam 27 opening the contacts 49 and 50 and closing the contacts 48 and 49 since the circuit through the contacts 48 and 49 is open at the auxiliary contacts 45 of the closed circuit breaker 1. The closing of the contacts 34 of relay 35 then renders the tap changing mechanism 7 operative to control the voltage of the load circuit 1.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States is:

1. In a system of electric distribution including an electric circuit, a transformer connected to said circuit and having a winding provided with a plurality of taps, tap-changing mechanism for changing from one tap to another of said winding, a circuit breaker in said circuit, means for opening said circuit breaker, and automatic reclosing means operative for a predetermined time interval in response to the opening of said circuit breaker to effect the reclosure of said circuit breaker a predetermined number of times within said predetermined time interval, a control arrangement for said tap-changing mechanism including means responsive to a predetermined electrical condition of said system for controlling the operation of said tap-changing mechanism, and means responsive to the opening of said circuit breaker for rendering said tap-changing mechanism inoperative while said automatic reclosing means is in operation.

2. In a system of electric distribution including an electric circuit, a transformer connected to said circuit and having a winding provided with a plurality of taps, tap-changing mechanism for changing from one tap to another of said winding, a circuit breaker in said circuit, means for opening said circuit breaker, automatic reclosing means for said circuit breaker comprising an electric motor and switching means driven by said motor, and means responsive to the opening of said circuit breaker for completing an energizing circuit for said motor for a predetermined time interval, a control arrangement for said tap-changing mechanism including means responsive to a predetermined electrical condition of said system for automatically controlling the operation of said tap-changing mechanism, and a relay connected in the circuit of said motor for rendering said tap-changing mechanism inoperative while said motor is energized.

3. In a system of electric distribution including an electric circuit, a transformer connected to said circuit and having a winding provided with a plurality of taps, tap-changing mechanism for changing from one tap to another of said winding, a circuit breaker in said circuit, means for opening said circuit breaker, automatic reclosing means for said circuit breaker comprising an electric motor and switching means driven by said motor, and means responsive to the opening of said circuit breaker for completing an energizing circuit for said motor for a predetermined time interval, a control arrangement for said tap-changing mechanism including means responsive to the voltage of said circuit for automatically controlling the operation of said tap-changing mechanism, and a relay connected in parallel with said motor for rendering said tap-changing mechanism inoperative while said motor is energized.

4. In a system of electric distribution including an electric circuit, a circuit breaker in said circuit, voltage regulating means for said circuit, means for opening said circuit breaker and automatic reclosing means operative for a predetermined time interval in response to the opening of said circuit breaker to effect the reclosure of said circuit breaker a predetermined number of times within said predetermined time interval, a control arrangement for said voltage regulating means including means responsive to a predetermined electrical condition of said system for controlling the operation of said voltage regulating means, and means responsive to the opening of said circuit breaker for rendering said voltage regulating means inoperative while said automatic reclosing means is in operation.

5. In a system of electric distribution including an electric circuit, a circuit breaker in said circuit, voltage regulating means for said circuit, means for opening said circuit breaker and automatic reclosing means for said circuit breaker comprising an electric motor, switching means driven by said motor, and means responsive to the opening of said circuit breaker for completing an energizing circuit for said motor for a predetermined time interval, a control arrangement for said voltage regulating means including means responsive to a predetermined electrical condition of said system for controlling the operation of said voltage regulating means, and means including a relay connected in parallel with said motor for rendering said voltage regulating means inoperative while said reclosing means is in operation.

6. In a system of electric distribution including an electric circuit, a circuit breaker in said circuit, means for opening said circuit breaker, and automatic reclosing means for said circuit breaker comprising an electric motor, switching means driven by said motor, and means responsive to the opening of said circuit breaker for completing an energizing circuit for said motor for a predetermined time interval, a control arrangement including a control device means responsive to a predetermined electrical condition of said system for controlling the operation of said control device, and means including a relay connected in parallel with said motor for rendering said control device inoperative while said circuit breaker is open.

7. In a system of electric distribution including an electric circuit, a transformer connected to said circuit and having a winding provided with a plurality of taps, a tap-changing mechanism for changing from one tap to another of said winding, a circuit breaker in said circuit, automatic reclosing means having a definite cycle of operation and arranged to effect a reclosure of said circuit breaker at predetermined points in said cycle if said circuit breaker is open at said points, control means for rendering said tap-changing mechanism inoperative during said cycle of operation of said automatic reclosing means, and means responsive to a fault on said system for initiating said cycle of operation of said automatic reclosing means and the operation of said control means.

8. In a system of electric distribution including an electric circuit, a circuit breaker in said circuit automatic reclosing means for said circuit breaker comprising an electric motor and switching means driven by said motor, means responsive to a fault on said system for completing an energizing circuit for said motor for a predetermined time interval, a control device and a relay connected in parallel with said motor for rendering said control device inoperative.

ARVID E. ANDERSON.